United States Patent
Zhang et al.

(10) Patent No.: US 12,048,012 B2
(45) Date of Patent: Jul. 23, 2024

(54) SPATIAL COLLISION HANDLING FOR MULTIPLE TRANSMIT AND RECEIVE POINT OPERATION

(71) Applicant: Apple Inc., Cupertino, CA (US)

(72) Inventors: Yushu Zhang, Beijing (CN); Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Oghenekome Oteri, San Diego, CA (US); Wei Zeng, Saratoga, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 275 days.

(21) Appl. No.: 17/439,268

(22) PCT Filed: Aug. 5, 2020

(86) PCT No.: PCT/CN2020/107170
§ 371 (c)(1),
(2) Date: Sep. 14, 2021

(87) PCT Pub. No.: WO2022/027340
PCT Pub. Date: Feb. 10, 2022

(65) Prior Publication Data
US 2022/0312485 A1    Sep. 29, 2022

(51) Int. Cl.
*H04W 74/0808*   (2024.01)
*H04L 5/00*       (2006.01)
(Continued)

(52) U.S. Cl.
CPC ....... *H04W 74/0825* (2013.01); *H04L 5/0023* (2013.01); *H04L 5/0073* (2013.01);
(Continued)

(58) Field of Classification Search
None
See application file for complete search history.

(56) References Cited

U.S. PATENT DOCUMENTS

| 2018/0343653 A1 | 11/2018 | Guo |
| 2020/0145982 A1 | 5/2020 | Cheng et al. |

(Continued)

FOREIGN PATENT DOCUMENTS

| CN | 110972515 | 4/2020 |
| CN | 111148260 | 5/2020 |
| WO | 2021072205 A2 | 4/2021 |

OTHER PUBLICATIONS

3rd Generation Partnership Project; Technical Specification Group Radio Access Network; Evolved Universal Terrestrial Radio Access (E-UTRA); Physical Channels and Modulation (Release 15), 3GPP TS 36.211 V15.5.0, Mar. 2019, 238 pages.

(Continued)

*Primary Examiner* — Diane L Lo
(74) *Attorney, Agent, or Firm* — Kilpatrick Townsend & Stockton LLP

(57) ABSTRACT

The present application relates to devices and components including apparatus, systems, and methods to address spatial collisions between physical downlink control channel and default physical downlink shared channel beams in wireless communication systems.

20 Claims, 12 Drawing Sheets

(51) Int. Cl.
    *H04W 72/044*    (2023.01)
    *H04W 72/0453*    (2023.01)
    *H04W 72/53*    (2023.01)

(52) U.S. Cl.
    CPC ..... *H04W 72/0453* (2013.01); *H04W 72/046* (2013.01); *H04W 72/53* (2023.01)

(56) References Cited

U.S. PATENT DOCUMENTS

| | | | | |
|---|---|---|---|---|
| 2021/0084669 | A1* | 3/2021 | Mondal | H04L 5/0094 |
| 2021/0112561 | A1* | 4/2021 | Zhou | H04W 80/02 |
| 2021/0274537 | A1* | 9/2021 | Lee | H04W 72/543 |
| 2021/0368457 | A1* | 11/2021 | Chen | H04L 5/0035 |
| 2022/0007410 | A1* | 1/2022 | Cirik | H04L 5/0078 |

OTHER PUBLICATIONS

3rd Generation Partnership Project; Technical Specification Group Radio Access Network; NR; Multiplexing and Channel Coding (Release 15), 3GPP TS 38.212 V15.5.0, Mar. 2019, 101 pages.
3rd Generation Partnership Project; Technical Specification Group Radio Access Network; NR; Physical channels and modulation (Release 15), 3GPP TS 38.211 V15.5.0, Mar. 2019, 96 pages.
3rd Generation Partnership Project; Technical Specification Group Radio Access Network; NR; Physical Layer Procedures for Control (Release 15), 3GPP TS 38.213 V15.5.0, Mar. 2019, 104 pages.
3rd Generation Partnership Project; Technical Specification Group Radio Access Network; NR; Physical layer Procedures for Data (Release 15), 3GPP TS 38.214 V15.5.0, Mar. 2019, 103 pages.
3rd Generation Partnership Project; Technical Specification Group Services and System Aspects; Architecture Enhancements for Non-3GPP Accesses (Release 15), 3GPP TS 23.402 V15.3.0, Mar. 2018, 314 pages.
Discussion of Rate Matching Methods for PDSCH Reliability Enhancement Schemes with Multi TRP Panel, HiSilicon Huawei, 3GPP TSG RAN WGI Meeting #96b, RI-1905268, Apr. 8-12, 2019, 12 pages.
Discussion on Beam Indication for PDSCH, Samsung, 3GPP TSG RAN WG1 Meeting #90bis, R1-1717612, Oct. 9-13, 2017, 5 pages.
Enhancements on Multi-TRP/panel Transmission, NTT Docomo, Inc., 3GPP TSG RAN WG1 #96bis, R1-1904966, Apr. 8-12, 2019, 29 pages.
Remaining Details on PDSCH Beam Indication, Samsung, 3GPP TSG RAN WG1 Meeting #91, R1-1720302, Nov. 27-Dec. 1, 2017, 4 pages.
WF on QCL Indication for DL Physical Channels, 3GPP TSG-RAN WG1 NR Ad Hoc #3, R1-1716842, Sep. 20, 2017, 9 pages.
International Patent Application No. PCT/US2020/031149, International Preliminary Report on Patentability, Mailed on Nov. 18, 2021, 15 pages.
International Patent Application No. PCT/US2020/031149, International Search Report and Written Opinion, Mailed on Oct. 13, 2020, 22 pages.
International Patent Application No. PCT/US2020/031149, Invitation to Pay Additional Fees and, Where Applicable, Protest fee, Mailed on Aug. 14, 2020, 19 pages.
On Multi-TRP/Multi-Panel Transmission, Intel Corporation, 3GPP TSG RAN WG1 Meeting #99 R1-1912222, Nov. 22, 2019, 8 pages.
International Patent Application No. PCT/CN2020/107170, International Search Report and Written Opinion, Mailed on Apr. 29, 2021, 9 pages.
3rd Generation Partnership Project; Technical Specification Group Radio Access Network; NR; Physical layer procedures for control (Release 16), 3GPP TS 38.213 V16.2.0, Jun. 2020, 176 pages.
3rd Generation Partnership Project; Technical Specification Group Radio Access Network; NR; Physical Layer procedures for data (Release 16), 3GPP TS 38.214 V16.2.0, Jun. 2020, 164 pages.
3rd Generation Partnership Project; Technical Specification Group Radio Access Network; NR; Radio Resource Control (RRC) protocol specification (Release 16), 3GPP TS 38.331 V16.1.0, Jul. 2020, 906 pages.
International Patent Application No. PCT/CN2020/107170, International Preliminary Report on Patentability, Feb. 16, 2023, 6 pages.
European Patent Application No. 20947957.5, Partial Supplementary European Search Report, Apr. 29, 2024, 25 pages.

* cited by examiner

SPATIAL COLLISION HANDLING FOR MULTIPLE TRANSMIT AND RECEIVE POINT OPERATION

CROSS REFERENCES TO RELATED APPLICATIONS

This application is the U.S. National Phase of PCT Application No. PCT/CN2020/107170, filed Aug. 5, 2020, the disclosure of which is incorporated by reference.

BACKGROUND

Third Generation Partnership Project (3GPP) networks provide that multiple transmit and receive points (TRPs) can send downlink transmissions to one user equipment (UE). The UE may have a plurality of antenna panels configured to receive these downlink transmissions. If the UE does not have sufficient time to process control information before receiving a downlink transmission, the UE may not have adequate information regarding how to configure the antenna panels for proper receipt of the downlink transmissions.

DETAILED DESCRIPTION

Figure 1:
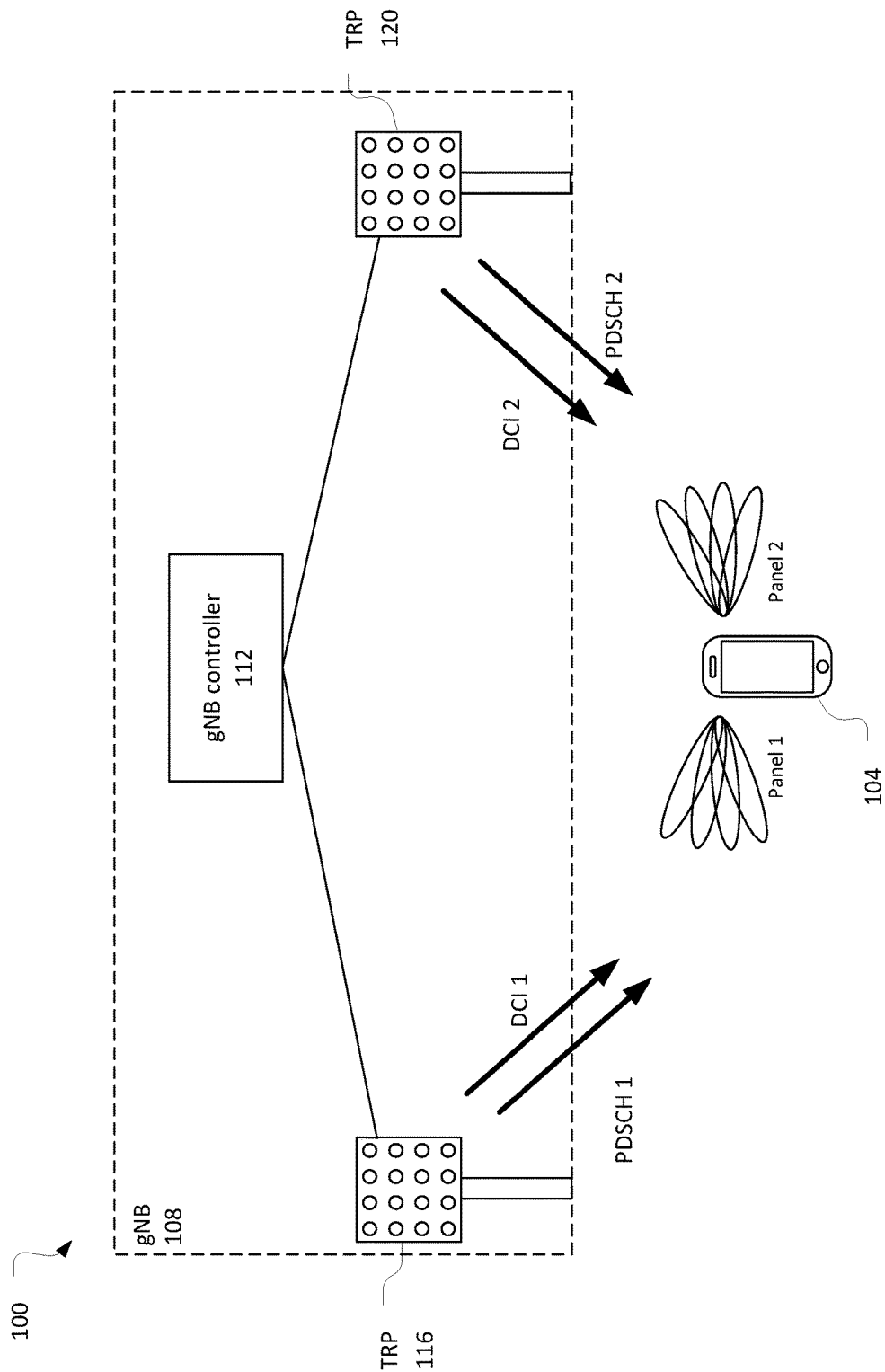
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 and a gNB 108. The gNB 108 may be a base station that provides a wireless access cell, for example, a 3GPP New Radio "NR" cell, through which the UE 104 may communicate with the gNB 108. The UE 104 and the gNB 108 may communicate over an air interface compatible with 3GPP technical specifications such as those that define Fifth Generation (5G) NR system standards.

The gNB 108 may include a gNB controller 112 coupled with one or more TRPs, for example, TRP 116 and TRP 120. In general, the gNB controller 112 may perform the majority of the operations of a communication protocol stack, including scheduling, while the TRPs 116 and 120 act as distributed antennas. In some embodiments, the TRPs 116 and 120 may perform some lower-level operations of the communication protocol stack (for example, analog physical (PHY) layer operations).

The gNB 108 may use the TRPs 116 and 122 to geographically separate points at which a signal may be transmitted to, or received from, the UE 104. This may increase flexibility of using multiple-input, multiple-output and beamforming enhancements for communicating with the UE 104. The TRPs 116 and 120 may be used to transmit the same or different downlink transmissions to the UE 104. In some embodiments, the distributed transmit/receive capabilities provided by the TRPs 116 and 120 may be used for coordinated multipoint or carrier aggregation systems.

The gNB 108 may transmit information (for example, data and control signaling) in the downlink direction by mapping logical channels on the transport channels, and transport channels onto physical channels. The logical channels may transfer data between a radio link control (RLC) and media access control (MAC) layers; the transport channels may transfer data between the MAC and PHY layers; and the physical channels may transfer information across the air interface.

The physical channels may include a physical broadcast channel (PBCH); a physical downlink control channel (PDCCH); and a physical downlink shared channel (PDSCH).

The PBCH may be used to broadcast a master information block (MIB) to provide information to facilitate access to the NR cell. The MIB may include a system frame number, cell barred flag, and information that may be used to receive a system information block 1 (SIB1). The MIB and the SIB1 may be used to transmit minimum system information that provides a basic parameter set that the UE 104 may use for initial access or acquiring any other system information.

The PBCH may be transmitted along with physical synchronization signals (PSS) and secondary synchronization signals (SSS) in a synchronization signal (SS)/PBCH block. The SS/PBCH blocks (SSBs) may be used by the UE 104 during a cell search procedure and for beam selection.

The PDSCH may be used to transfer end-user application data, signaling radio bearer (SRB) messages, system information messages (other than, for example, MIB), and paging messages.

The PDCCH may transfer downlink control information (DCI) that is used by a scheduler of the gNB controller 112 to allocate both uplink and downlink resources. The DCI may also be used to provide uplink power control commands, configure a slot format, or indicate that preemption has occurred.

In some embodiments, the UE 104 may include a number of antenna elements in one or more antenna panels that allow receive or transmit beamforming. FIG. 1 shows UE 104 with two antenna panels, panel 1 and panel 2. In the downlink direction, the UE 104 may select a beam to receive downlink transmissions based on SSBs and channel state information—reference signals (CSI-RSs). The UE 104, while in a radio resource control (RRC)-idle mode, may perform an initial acquisition during a random access procedure using SSBs and physical random access channel (PRACH) preambles to establish uplink and downlink beam pairs. These initial beam pairs may correspond to relatively wide beams.

The UE 104 may then enter an RRC-connected mode and initiate beam refinement procedures to select beams that are more directional and have higher gain. The beam refinement procedures may be based on CSI-RS.

While beamforming may be performed in both frequency range (FR) 1 (410 to 7125 MHz) and FR 2 (24250 to 52600 MHz), receive beamforming at the UE 104 may be more applicable to FR2, as the UE 104 is able to have more antennas due to the shorter wavelengths.

Transmissions that use different antenna ports may experience different radio channels. However, in some situations, different antenna ports may share common radio channel characteristics. For example, different antenna ports may have similar Doppler shifts, Doppler spreads, average delay, delay spread, or spatial receive parameters (for example, properties associated with a downlink received signal angle of arrival at a UE). Antenna ports that share one or more of these large-scale radio channel characteristics may be said to be quasi co-located (QCL) with one another. 3GPP has specified four types of QCL to indicate which particular channel characteristics are shared. In QCL Type A, antenna ports share Doppler shift, Doppler spread, average delay, and delay spread. In QCL Type B, antenna ports share Doppler shift and Doppler spread are shared. In QCL Type C, antenna ports share Doppler shift and average delay. In QCL Type D, antenna ports share spatial receiver parameters.

The gNB 108 may provide transmission configuration indicator (TCI) state information to the UE 104 to indicate QCL relationships between antenna ports used for reference signals (for example, SSB or CSI-RS) and downlink data or control signaling, for example, PDSCH or PDCCH. The gNB 108 may use a combination of RRC signaling, MAC control element signaling, and DCI, to inform the UE 104 of these QCL relationships.

Initially, the gNB 108 may configure the UE 104 with a plurality of TCI states through RRC signaling. In some embodiments, up to 128 TCI states may be configured for PDSCH through, for example, a PDSCH-config information element, and up to 64 TCI states may be configured for PDCCH through, for example, a PDCCH-config information element. Each TCI state may include a cell identifier, a bandwidth part identifier, an indication of the relevant SS/PBCH block or CSI-RS, and an indication of the QCL type. The TCI states may be set as inactive after initial configuration.

The gNB 108 may then transmit an activation command through, for example, a MAC control element. The activation command may activate up to eight combinations of one or two TCI states that correspond to eight codepoints of a TCI field in DCI. One or more specific TCI states may then be dynamically selected and signaled using the TCI field in DCI to indicate which of the active TCI states are applicable to a PDSCH resource allocation.

The gNB 108 may transmit the PDCCH using resource elements that belong to a control resource set (CORESET). A search space configuration may refer to a particular CORESET to define a search space, for example, a specific set of resource blocks and symbols where the UE 104 is to attempt to decode the PDCCH.

The gNB 108 may configure up to three CORESETs for an active downlink bandwidth part of a serving cell. The CORESET may be configured by a ControlResourceSet information element that defines frequency domain resources to indicate resource blocks allocated to the CORESET, a duration to indicate a number of symbols allocated to the CORESET (which may be 1, 2, or 3 orthogonal frequency division multiplexing (OFDM) symbols), and QCL information to support a successful reception of the PDCCH.

The QCL information in the ControlResourceSet information element may be provided by listing identities of TCI states. The TCI states identified in the ControlResourceSet information element may be a subset of the TCI states defined in the PDSCH-config that are in the active downlink bandwidth part to which the CORESET belongs. If the ControlResourceSet information element only provides a single TCI state, the UE 104 may assume a QCL relationship between the PDCCH and reference signal specified by that TCI state. If a plurality of TCI states are listed, the UE 104 may rely on an activation command, such as that described above, to identify the TCI state to apply.

In some embodiments, the gNB 108 may configure one or more CORESET pools to facilitate the use of multiple PDCCHs that may potentially schedule fully or partially overlapped PDSCHs in time. To configure the CORESET pools, the gNB 108 may include a CORESET pool index in the ControlResourceSet IE to associate the CORESET with a corresponding CORESET pool. In some embodiments, the gNB 108 may configure up to two different CORESET pools.

The gNB 108 may operate in a single-DCI mode or a multi-DCI mode. In a single-DCI mode, one TRP may transmit DCI to schedule PDSCH transmissions from a plurality of TRPs. For example, TRP 116 may transmit DCI 1 to schedule both PDSCH 1 from TRP 116 and PDSCH 2 from TRP 120. In a multi-DCI mode, each TRP may transmit its own DCI to schedule its own PDSCH transmissions. For example, TRP 116 may transmit DCI 1 to schedule PDSCH 1 from TRP 116 and TRP 120 may transmit DCI 2 to schedule PDSCH 2 from TRP 120.

In various embodiments, the gNB 108 may schedule PDSCH 1 and PDSCH 2 using different multiplexing techniques. In a first example, frequency division multiplexing (FDM) may be used by providing different resource block group (RBG) sets for different PDSCH transmissions. In a second example, spatial division multiplexing (SDM) may be used by providing different DMRS code-division multiplexing (CDM) groups for the different PDSCH transmissions. In a third example, time-division multiplexing (TDM) may be used by transmitting the PDSCH transmissions in different OFDM symbols.

For multi-TRP operation using single DCI-mode, the UE 104 may need to select a default PDSCH TCI state from the activated combinations in some scenarios. For example, if the UE 104 supports receive beamforming and a scheduling offset between a PDCCH and a PDSCH is below a threshold, the UE 104 may not have sufficient time to receive and process the DCI to determine the selected TCI state. Thus, the UE 104 (and, therefore, the gNB 108) may need to proceed based on default assumptions of TCI state for the PDSCH.

In some embodiments, the gNB 108 may enable the UE 104 to use two default beams to receive PDSCH when the scheduling offset is below the threshold. The scheduling offset may be a time between a DCI and the scheduled PDSCH. In some embodiments, the scheduling offset may be determined based on a last symbol of the scheduling DCI and a first symbol of the scheduled PDSCH. The threshold may be based on a capability of the UE 104 and, in some embodiments, may be reported to the gNB 108 from the UE 104 in a UE capability report.

In some embodiments, the gNB 108 may enable the two default beams by providing appropriate RRC parameter in a serving cell configuration information element that is used to configure (for example, add or modify) the UE 104 with a serving cell. For single-DCI mode, the RRC parameter may be an enable TwoDefaultTCIStates RRC parameter. If enabled, the default PDSCH beams may be based on a lowest TCI codepoint among the active code points that includes two TCI states. For multi-DCI mode, the RRC parameter may be an enableDefaultTCIStatePerCoreset-PoolIndex RRC parameter. If enabled, the default PDSCH beams may be based on a CORESET having a lowest identifier in a latest slot among CORESETs in each CORESET pool.

In some situations, enabling multiple default beams to receive PDSCH transmissions may result in spatial collisions between the PDSCH transmissions and other PDCCH transmissions in the same or different serving cells. Thus, various embodiments describe operations in which spatial collision between PDCCH and default PDSCH beams in multi- and single-DCI mode may be handled. The collision handling may be described with respect to FDM, TDM, and CDM schemes.

Figure 2:
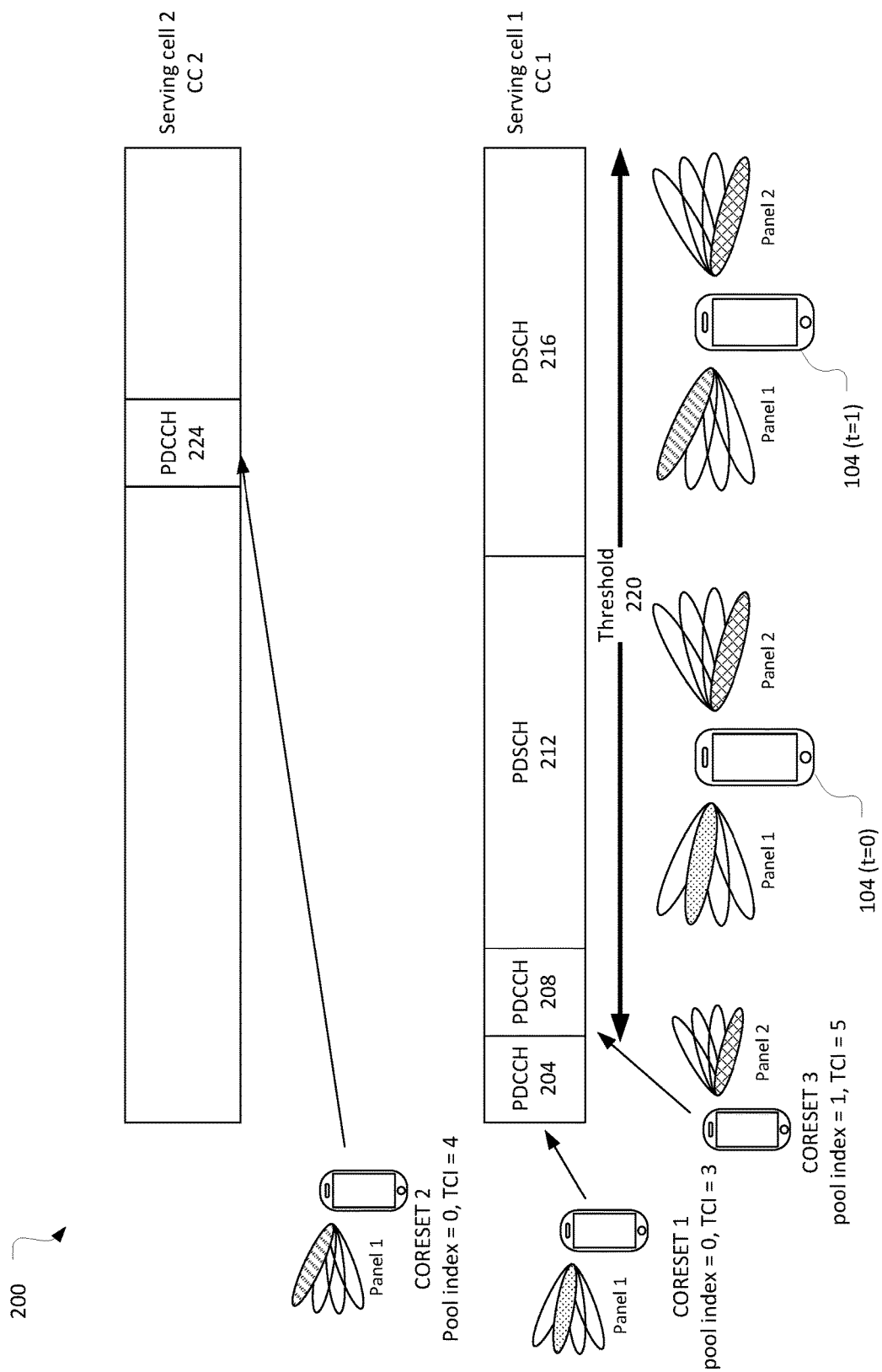
FIG. 2 illustrates downlink transmissions in accordance with some embodiments.

FIG. 2 illustrates downlink transmissions 200 in accordance with some embodiments. The downlink transmissions 200 may be in a first serving cell on a first component carrier (CC 1) and a second serving cell on second component carrier (CC 2). The component carriers may be part of a carrier aggregation implementation in which one of the serving cells is a primary serving cell and the other serving cell is a secondary serving cell. In other embodiments, the serving cells may be different primary serving cells. The serving cells may be located in the same band or in the same band group.

Serving cell 1 may include PDCCH 204 that schedules PDSCH 212 and PDCCH 208 that schedules PDSCH 216. PDCCH 204 and PDSCH 212 may be transmitted from TRP 116, while PDCCH 208 and PDSCH 216 may be transmitted from TRP 120. Thus, this may represent a multi-DCI mode operation.

The scheduling offsets between PDCCH 204/PDSCH 212 and PDCCH 208/PDSCH 216 may be less than a predetermined threshold 220, which may be based on UE capability. Thus, the UE 104 may determine a plurality of default beams to receive the PDSCH transmissions.

PDCCH 204 may be transmitted on resource elements of CORESET 1. CORESET 1 may be configured with a pool index equal to zero and a TCI state equal to three. The parameters of CORESET 1 may indicate that antenna panel 1 should be configured with a third receive beam. The beams indicated by, or associated with, a CORESET may be determined through beam management operations (for example, initial acquisition and refinement as described above) based on reference signals and QCL/TCI information as defined by a corresponding CORESET. As used herein, the receive beams may be numbered one through four beginning with the bottom beam. This numbering scheme is used to facilitate the present description, but is generally arbitrary. Other beam numbering schemes and number of beams may be used in various embodiments.

PDCCH 208 may be transmitted on resource elements of CORESET 3. CORESET 3 may be configured with a pool index equal to one and a TCI state equal to five. The parameters of CORESET 3 may indicate that antenna panel 2 should be configured with a first receive beam.

The third PDCCH, PDCCH 224, may be transmitted in the second serving cell. PDCCH 224 may be transmitted on resource elements of CORESET 2. CORESET 2 may be configured with a pool index equal to zero and a TCI state equal to four. The parameters of CORESET 2 may indicate that a first antenna panel should be configured with a fourth receive beam.

The UE 104 may initially configure its first and second antenna panels with default PDSCH beams based on CORE-SETs 1 and 3. Therefore, at a first time period, for example, t=0, the UE 104 may configure antenna panel 1 with the third receive beam (based on CORESET 1) and antenna panel 2 with the first receive beam (based on CORESET 3) to receive the PDSCH transmissions.

In some embodiments, for each CORESET pool, if there is one existing CORESET in the same serving cell or another serving cell, the default PDSCH beam for this CORESET pool may be based on this existing CORESET. So, with reference to FIG. 2, when PDCCH 224 is received it overlaps with PDSCH transmission and, therefore, there is an existing CORESET for CORESET pool 0. The UE 104 may then set the default PDSCH beam based on this existing CORESET, that is, CORESET 2. Thus, at a second time period, for example, t=1, the UE 104 may configure antenna panel 1 with the fourth beam (based on CORESET 2). This may configure the UE 104 to properly receive the PDCCH 224.

In some embodiments, the first time period may correspond to a first slot in which the UE 104 may receive PDSCH 212 and the second time period may correspond to a second slot in which the UE 104 may receive PDSCH 216. However, in other embodiments the first and second time periods may correspond to periods greater or less than one slot.

In some embodiments, the UE 104 may still be able to use two beams to receive the PDSCH in the second time period, one beam for each CORESET pool. The second beam, in the embodiment shown, may be the first beam for antenna panel 2 based on CORESET 3.

In some embodiments, if the existing CORESET is from another serving cell that is not configured in multi-DCI mode, or the existing CORESET does not have a CORESET pool index configured, the UE 104 may proceed based on one of two options.

In a first option, the UE 104 may assume the CORESET pool index is equal zero or one. If the UE 104 assumes the CORESET pool index is equal to zero, the UE 104 may operate as shown in FIG. 2 and described above. If the UE 104 assumes the CORESET pool index is equal to one, the UE 104 may utilize beam number four for panel 2. For example, the default beam configuration from CORESET 2 may replace the default beam configuration from CORESET 3.

In a second option, the UE 104 may configure the default PDSCH beam based on one TCI from the existing CORESET. For example, in the second time period the UE 104 may configure antenna panel 1 with the fourth beam based on CORESET 2 and deactivate antenna panel 2.

In some embodiments, the UE 104 may detect a plurality of existing CORESETs in the same serving cell or in serving cells in a common band or band group. In these embodiments, the UE 104 may determine a priority of the existing CORESETs. The default PDSCH beam may then be set based on the CORESET having the highest relative priority.

In some embodiments, the UE 104 may determine a CORESET having the highest relative priority for each CORESET pool and select that CORESET to establish a default PDSCH beam. Consider, for example, that the UE 104 determines two CORESETS exist for pool 0 (for example, CORESET 1 and CORESET 2, with CORESET 1 being the higher priority CORESET) at a given time, and one CORESET exists for pool 1 at the given time (for example, CORESET 3). In this situation, the UE 104 may select a first default PDSCH beam based on CORESET 1 for pool 0 and a second default PDSCH beam based on CORESET 3 for pool 1.

The CORESET priority for each CORESET pool may be determined based on a search space associated with the CORESET. The parameters of a search space that may be used to establish priority may include, but are not limited, to a search space type for example, (common search space (CSS) or UE-specific search space (USS)), periodicity, size, CORESET ID, etc. If two CORESETs are associated with common search spaces, the priority may be based on subtype, for example, whether the search space is Type 0, Type 0A, Type 1, Type 2, or Type 3. While not limited to such, in some embodiments a CSS may be prioritized over a USS; a CORESET corresponding to a CSS set with a lower index may be prioritized over a CORESET corresponding to a CSS set with a higher index; and a CORESET corresponding to a USS set with a lower index may be prioritized over a CORESET corresponding to a USS set with a higher index, etc.

Figure 3:
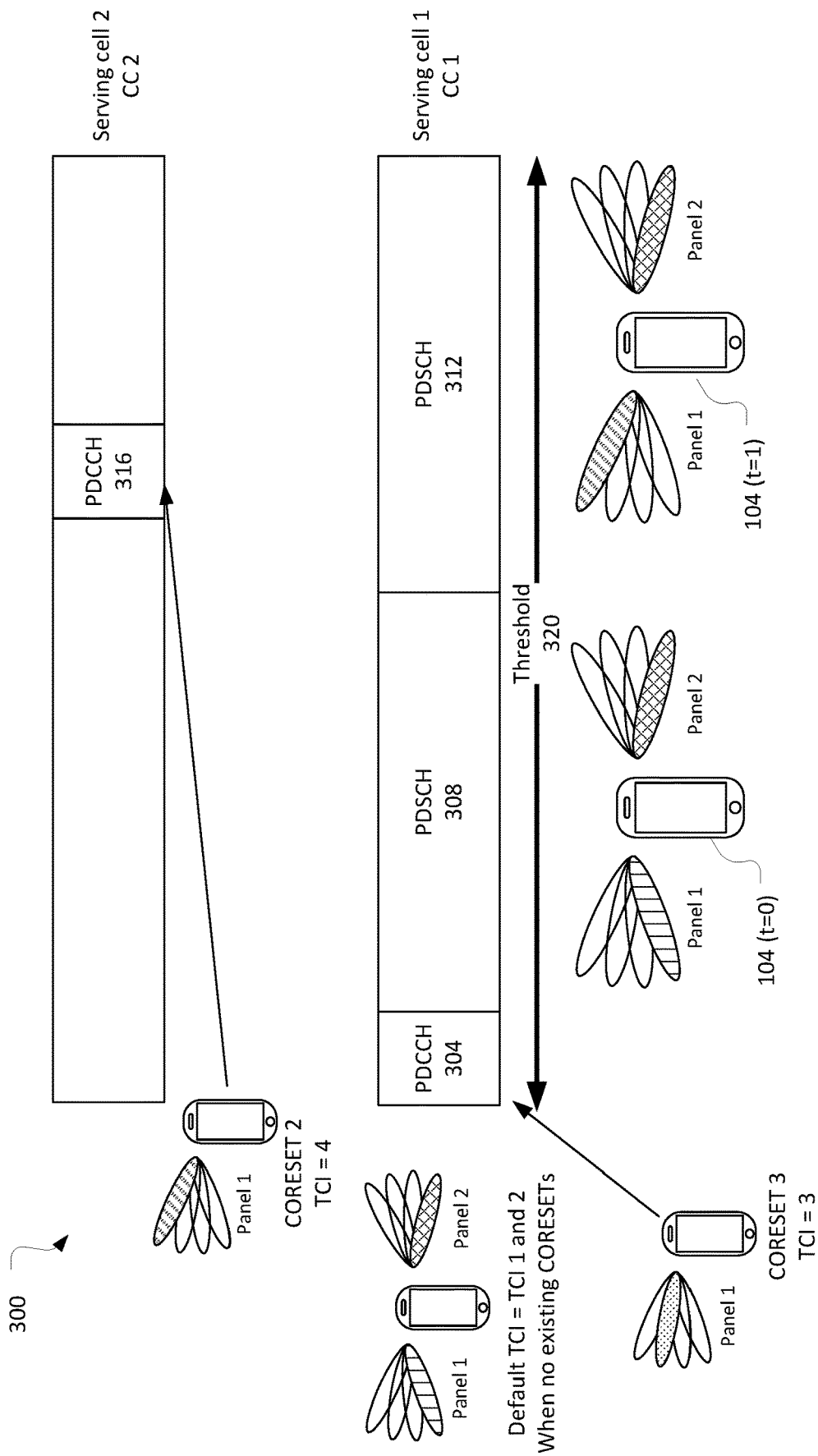
FIG. 3 illustrates downlink transmissions in accordance with some embodiments.

FIG. 3 illustrates downlink transmissions 300 in accordance with some embodiments. The downlink transmissions 300 may be based on an FDM or SDM transmission scheme.

The downlink transmissions 300 may be in a first serving cell on a first component carrier (CC 1) and a second serving cell on a second component carrier (CC 2). The component carriers may be part of a carrier aggregation implementation in which one of the serving cells is a primary serving cell and the other serving cells a secondary serving cell. In other embodiments, the serving cells may be different primary serving cells. The serving cells may be located in the same band or in the same band group.

Serving cell 1 may include PDCCH 304 that schedules PDSCH 308 and PDSCH 312. The PDCCH 304 and PDSCH 308 may be transmitted from TRP 116, while PDSCH 312 may be transmitted from TRP 120. Thus, this may represent a single-DCI mode operation.

The scheduling offsets between PDCCH 304 and the PDSCH transmissions may be less than the predetermined threshold 320, which may be based on UE capability. Thus, the UE 104 may determine a plurality of default beams to receive the PDSCH transmissions.

The UE 104 may select a default TCI to be equal to the TCI states in a lowest codepoint of active TCI states that includes a combination of two TCI states. For the present description, consider the two TCI states to be TCI 1 and TCI 2.

If no other CORESETs are existing, then the UE 104 may configure its antenna panels based on the default TCI. For example, the UE 104 may configure antenna panel 1 with a first receive beam (based on TCI 1, for example) and may configure antenna panel 2 with the first receive beam (based on TCI 2, for example) during a first time period.

In some embodiments, for FDM/SDM schemes, if there is one existing CORESET in the same serving cell or another serving cell, the default PDSCH beam may be based on the beam for the existing CORESET. In some embodiments, the UE 104 may receive the PDSCH with a beam based on the existing CORESET and either the first or second beam based on the default TCI. So, with reference to FIG. 3, when PDCCH 316 is received there is an existing CORESET, for example, CORESET 2. As a result, the UE 104 may configure antenna panel 1 with the fourth beam (based on CORESET 2) during the second time period, for example, t=1.

Figure 4:
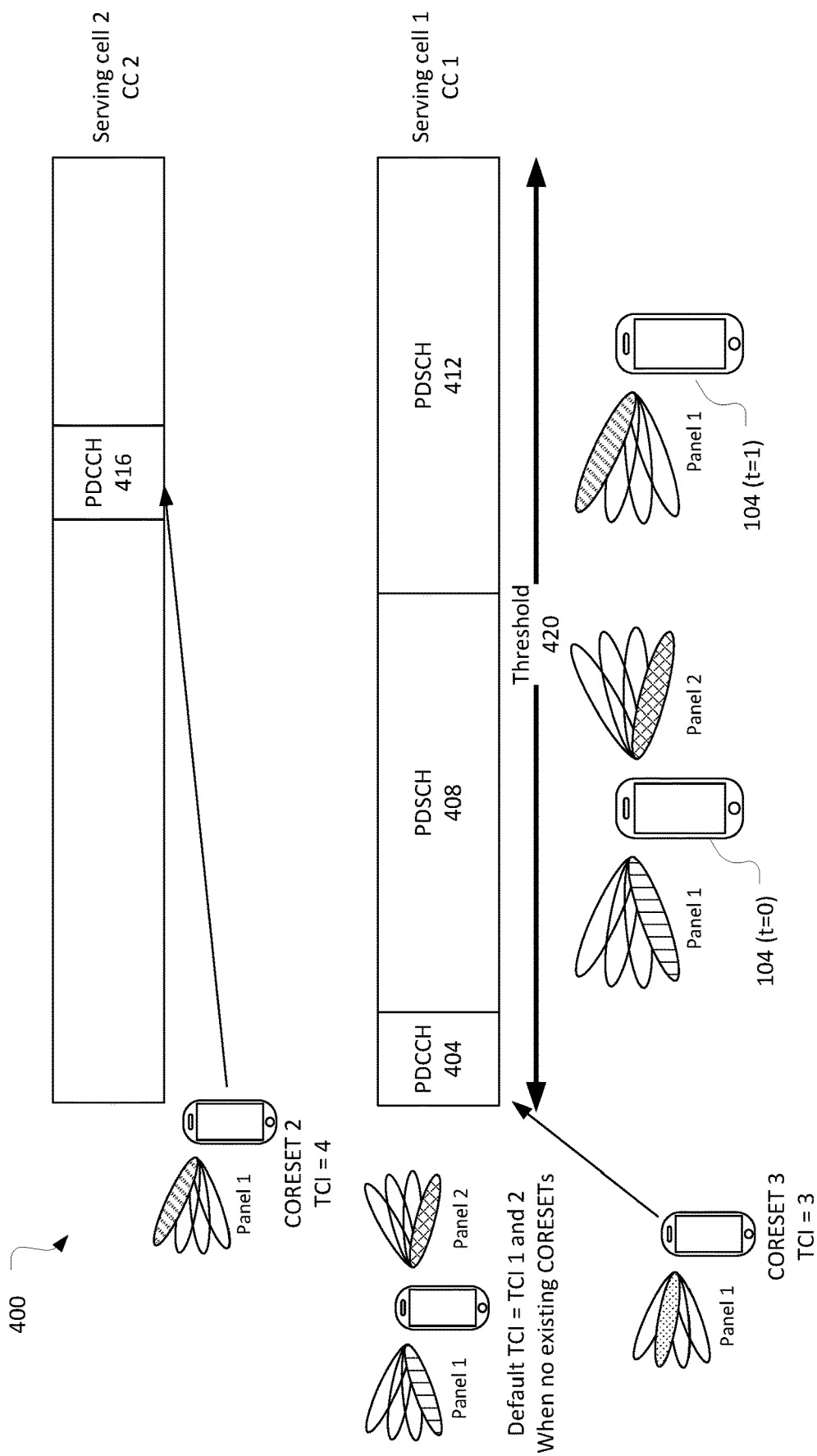
FIG. 4 illustrates downlink transmissions in accordance with some embodiments.

FIG. 4 illustrates downlink transmissions 400 in accordance with some embodiments. The downlink transmissions 400 may be based on an FDM or SDM transmission scheme.

The downlink transmissions 400 may be similar to those described above with respect to downlink transmissions 300. However, instead of using receiving the PDSCH with the existing CORESET beam and first/second default TCI beam, as described above, the UE 104 may receive the PDSCH with the CORESET beam only.

So, when PDCCH 416 is received and there is an existing CORESET, for example, CORESET 2, the UE 104 may configure antenna panel 1 with the fourth beam (based on CORESET 2) during the second time period, for example, t=1. The second antenna panel may be deactivated and, therefore, not be used for the reception of the corresponding PDSCH, for example, PDSCH 412.

The single-DCI mode operation described for FDM/SDM schemes with respect to FIGS. 3 and 4 may be considered alternatives to one another. In some embodiments, the gNB 108 may configure the UE 104 to use one of the two options. This control signaling may be higher-layer signaling such as, but not limited to, RRC signaling or MAC signaling (for example, a MAC control element). In some embodiments, the UE 104 may send an indication of whether it supports one or both of these options in a UE capability report. If the UE 104 supports both options, the UE 104 may select one of the options based on control signaling from the gNB 108 or other predefined configuration information.

In some embodiments, similar to those described above with respect to FIG. 2, multiple CORESETs may exist at a given time in the same serving cell or in serving cells in a common band or band group. For single-DCI mode, the UE may also determine a priority of the multiple CORESETs and select the CORESET having the highest relative priority for the default PDSCH beam. In some embodiments, the priority may be determined for each CORESET pool. If existing CORESETs from both CORESET pools are present, the UE 104 may select both beams to receive the PDSCH. In some embodiments, the UE 104 may determine CORESET priority across CORESET pools. For example, if CORESET pool 1 includes a top and medium priority CORESET, and CORESET pool 2 includes a low priority CORESET, the UE 104 may select the beams corresponding to both CORESETs of CORESET pool 1 for receiving the PDSCH.

The relative priority of the CORESETs may be based on associated search spaces as described above with respect to FIG. 2.

Figure 5:
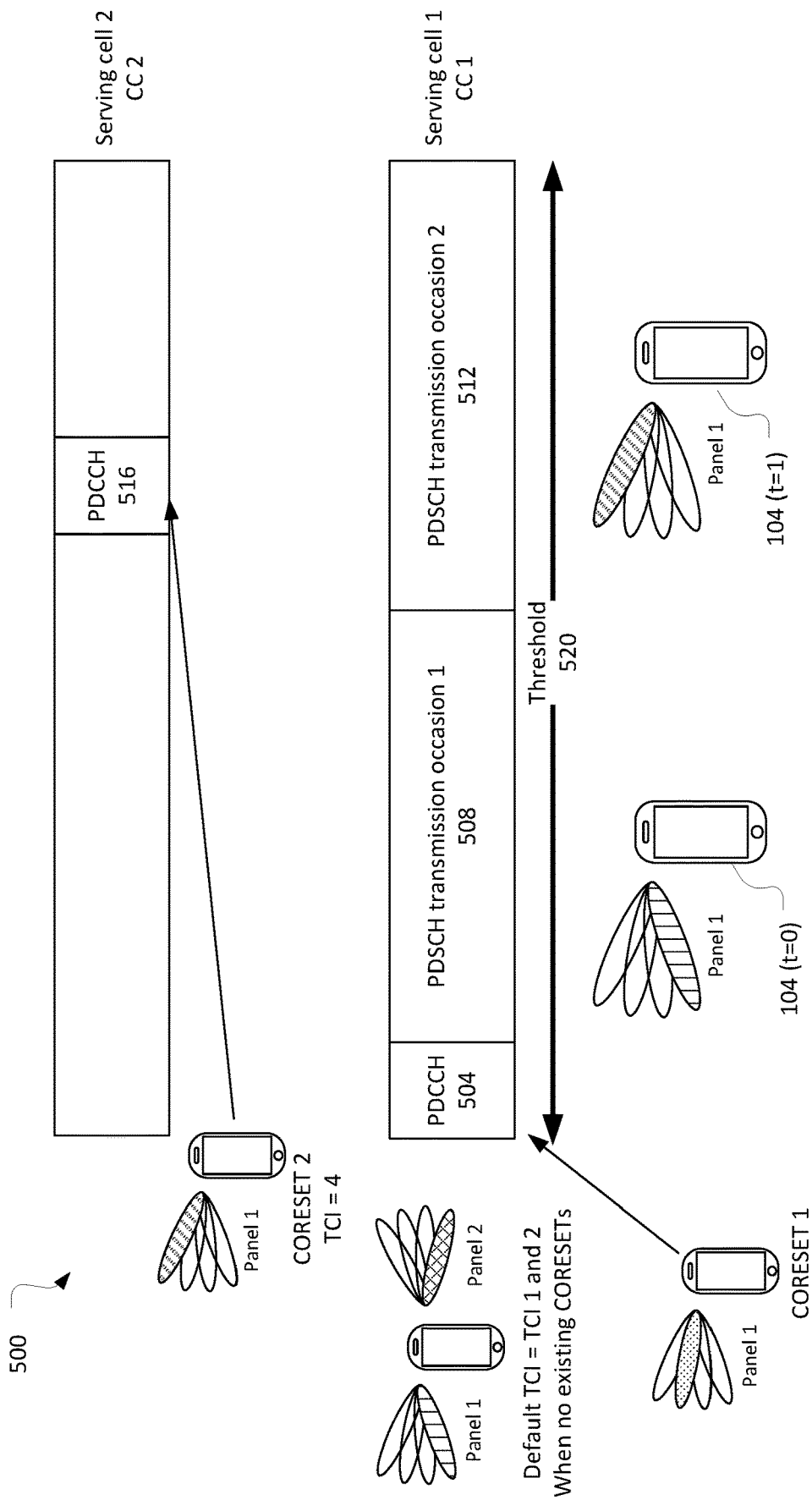
FIG. 5 illustrates downlink transmissions in accordance with some embodiments.

FIG. 5 illustrates downlink transmissions 500 in accordance with some embodiments. The downlink transmissions 500 may be based on a TDM transmission scheme.

Similar to downlink transmissions 300 and 400, downlink transmissions 500 may correspond to single-DCI mode operation. The downlink transmissions 500 include PDCCH 504 scheduling a first PDSCH transmission occasion 508 for a PDSCH transmission from TRP 116 and second PDSCH transmission occasion 512 for a PDSCH transmission from TRP 120.

As shown in FIG. 5, to receive the PDCCH 504, the UE may configure panel 1 with beam 3, based on CORESET 1. If no other CORESETs are existing after reception of PDCCH 504, the UE 104 may configure panel 1 with a first default PDSCH beam based on one of the default TCIs, for example, TCI 1, for first time period (t=0). The first time period may be a slot in which PDSCH transmission occasion 1 508 occurs.

In some embodiments, for a TDM scheme using single-DCI mode operation, if there is one existing CORESET in the same serving cell or another serving cell, the UE 104 may set the default PDSCH beam for a current transmission occasion based on the beam for the existing CORESET. So, with reference to FIG. 5, when PDCCH 516 is received there is an existing CORESET, for example, CORESET 2. As a result, the UE 104 may configure antenna panel 1 with the fourth beam (based on CORESET 2) during the second time period, for example, t=1. Therefore, the UE 104 may apply a default PDSCH beam, based on default TCI, for transmission occasions that do not collide with other CORESETs, and may apply an existing CORESET beam for transmission occasions that do collide with other CORESETs.

In embodiments in which a plurality of CORESETs exist at a particular time, the UE 104 may determine which of the plurality of CORESETs have the greatest priority and apply a beam corresponding to that CORESET for the corresponding transmission occasion. This may be done similar that described elsewhere herein.

Figure 6:
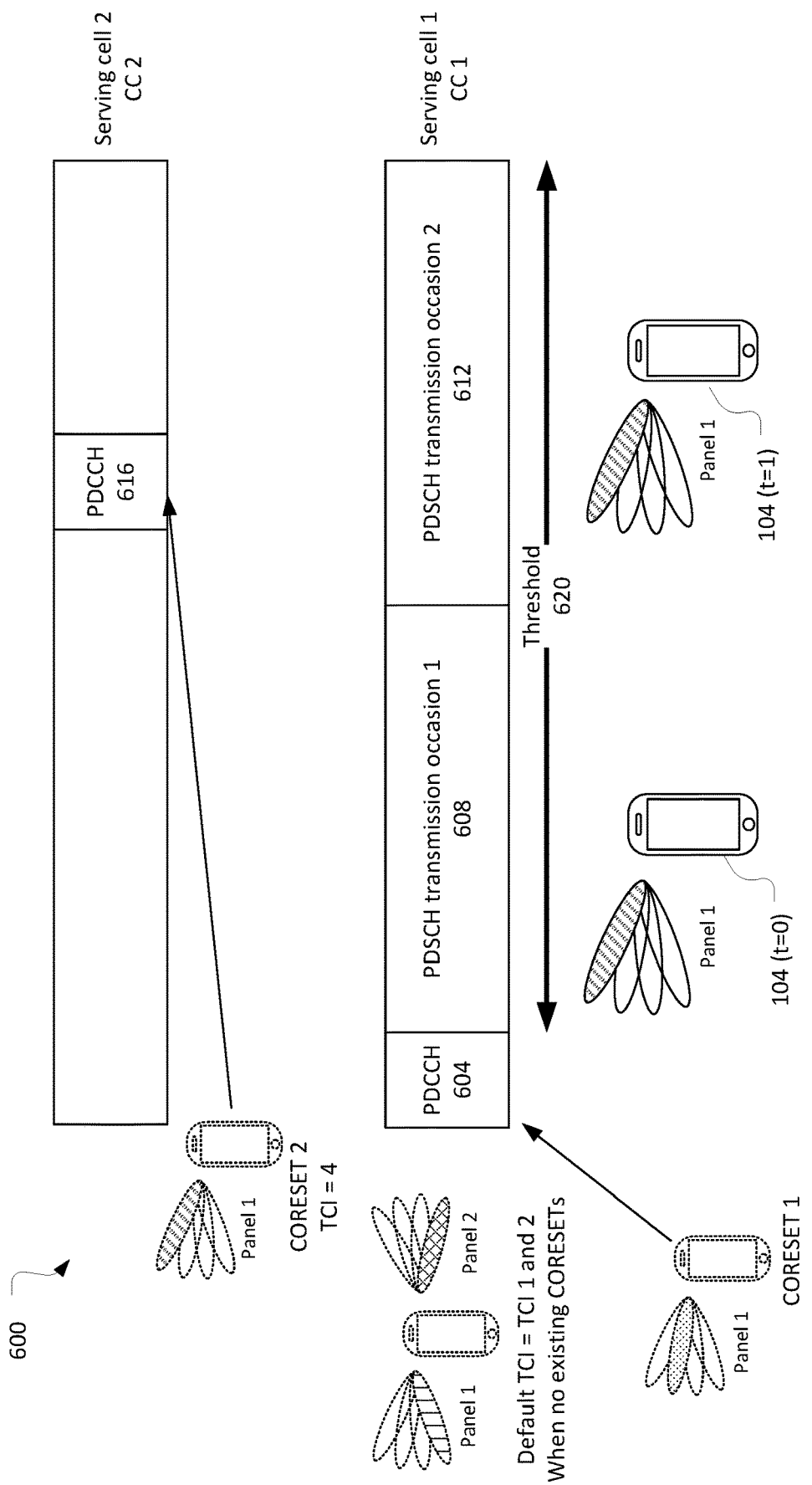
FIG. 6 illustrates downlink transmissions in accordance with some embodiments.

FIG. 6 illustrates downlink transmissions 600 in accordance with some embodiments. The downlink transmissions 600 may be based on a TDM transmission scheme.

The downlink transmissions 600 may be similar to those described above with respect to downlink transmissions 500. However, in this embodiment, instead of applying the default PDSCH beam, based on default TCI, for transmission occasions that do not collide with a CORESET, the UE 104 may apply the CORESET beam to all transmission occasions. So, with respect to FIG. 6, because PDCCH 616 collides with PDSCH transmission occasion 2 612, the UE 104 may set the default PDSCH beam to the fourth beam on panel 1 (based on CORESET 2) for all transmission occasions, for example, PDSCH transmission occasion 1 608 and PDSCH transmission occasion 2 612.

The single-DCI mode operation described for TDM schemes with respect to FIGS. 5 and 6 may be considered alternatives to one another. In some embodiments, the gNB 108 may configure the UE 104 to use one of the two options. For example, if both options are available, the gNB 108 may determine one option is desirable over the other in certain scenarios. For example, the gNB 108 may determine that the option embodied by FIG. 6 may be advantageous when the TDM scheme is an intra-slot TDM scheme with the two PDSCH transmission occasions being in the same slot. Alternatively, the gNB 108 may determine that the option embodied by FIG. 5 may be advantageous when the TDM scheme is an inter-slot TDM scheme with the two PDSCH transmission occasions being in different slots.

This control signaling may be higher-layer signaling such as, but not limited to, RRC signaling or all MAC signaling (for example, a MAC control element). In some embodiments, the UE 104 may send an indication of whether it supports one or both of these options in a UE capability report. If the UE 104 supports both options, the UE 104 may select one of the options based on control signaling from the gNB 108 or other predefined configuration information.

In some embodiments, the UE 104 may provide measurement reports for different measurement process identifiers, each associated with a particular reference signal (for example, SSB/CSI-RS). Reference signals having the same measurement process ID can be assumed to be received by same antenna panel. Reference signals with different measurement process IDs can be assumed to be received by different panels and can be received simultaneously. If there is one existing CORESET, the UE 104 may measure reference signals, and provide corresponding measurement report, based on its TCI instead of the reference signals associated with default PDSCH TCI with the same measurement process ID. If there are multiple existing CORESETs with TCIs from the same measurement process ID, the UE 104 can select the one with the highest priority to serve as basis for measurement report instead of the default PDSCH TCI with the same measurement process ID. The priority of multiple existing CORESETs may be based on search spaces associated with respective CORESETs.

If one reference signal has not been reported or the report is out of date, the measurement report for the measurement process ID can be based on a default value, for example, zero.

Figure 7:
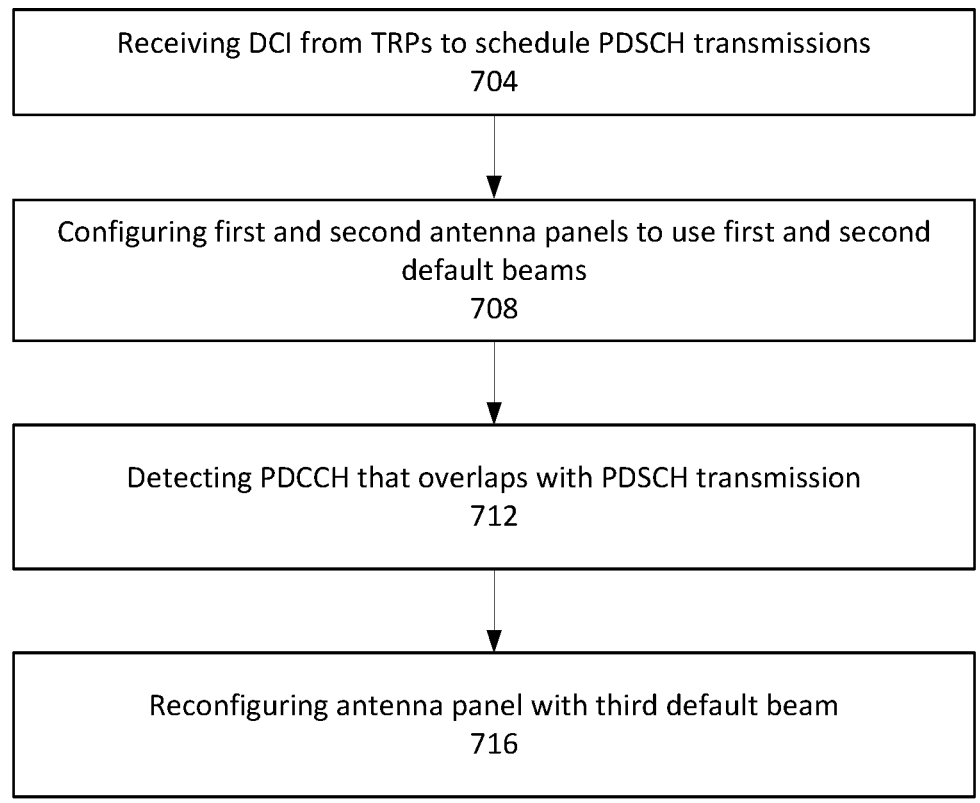
FIG. 7 illustrates an operational flow/algorithmic structure in accordance with some embodiments.

FIG. 7 may include an operation flow/algorithmic structure 700 in accordance with some embodiments. The operation flow/algorithmic structure 700 may be performed or implemented by a UE such as, for example, UE 104 or 1100; or components thereof, for example, baseband processor 1104A.

The operation flow/algorithmic structure 700 may include, at 704, receiving DCI from TRPs to schedule PDSCH transmissions. In some embodiments, the DCI may include DCI from a first/second TRPs that respectively schedule first/second PDSCH transmissions. In other embodiments, the DCI may include DCI from the first TRP that schedules both first and second PDSCH transmissions. The first and second PDSCH transmissions may be scheduled in an FDM manner, SDM manner, or TDM manner.

The DCI may be included in respective PDCCH transmissions, with each PDCCH transmission being transmitted on resource elements associated with a corresponding CORESET. The CORESETs may include TCI states that the UE may use to determine QCL information to facilitate a determination of a beam to receive the corresponding PDCCH transmission. The UE may configure first and second antenna panels to receive the PDCCH transmissions based on the beams determined from the corresponding CORESET.

The operation flow/algorithmic structure 700 may further include, at 708, configuring first and second antenna panels to use first and second default beams for receiving the PDSCH transmissions. The first and second default beams for receiving the PDSCH transmissions may be defaulted to the same beams that were used to receive the PDCCH transmissions. That is, the beams based on CORESETs associated with the PDCCH that transmitted the scheduling DCI.

The operation flow/algorithmic structure 700 may further include, at 712, detecting PDCCH that overlaps with a PDSCH transmission. The UE may determine that a CORESET exists during the receiving of the PDSCH transmission by detecting a PDCCH associated with the existing CORESET that overlaps the PDSCH transmission. The overlapping PDCCH may be in the same serving cell is the PDSCH transmissions or may be in another serving cell that is in a common band or band group with the serving cell of the PDSCH transmissions.

The operation flow/algorithmic structure 700 may further include, at 716, reconfiguring an antenna panel with a third default beam. The third default beam may be based on the existing CORESET. In some embodiments, one of the antenna panels may be re-configured with the third default beam while the other antenna panel remains configured with the first or second default beam. In other embodiments, only the antenna panel reconfigured with the third default beam may be activated.

Figure 8:
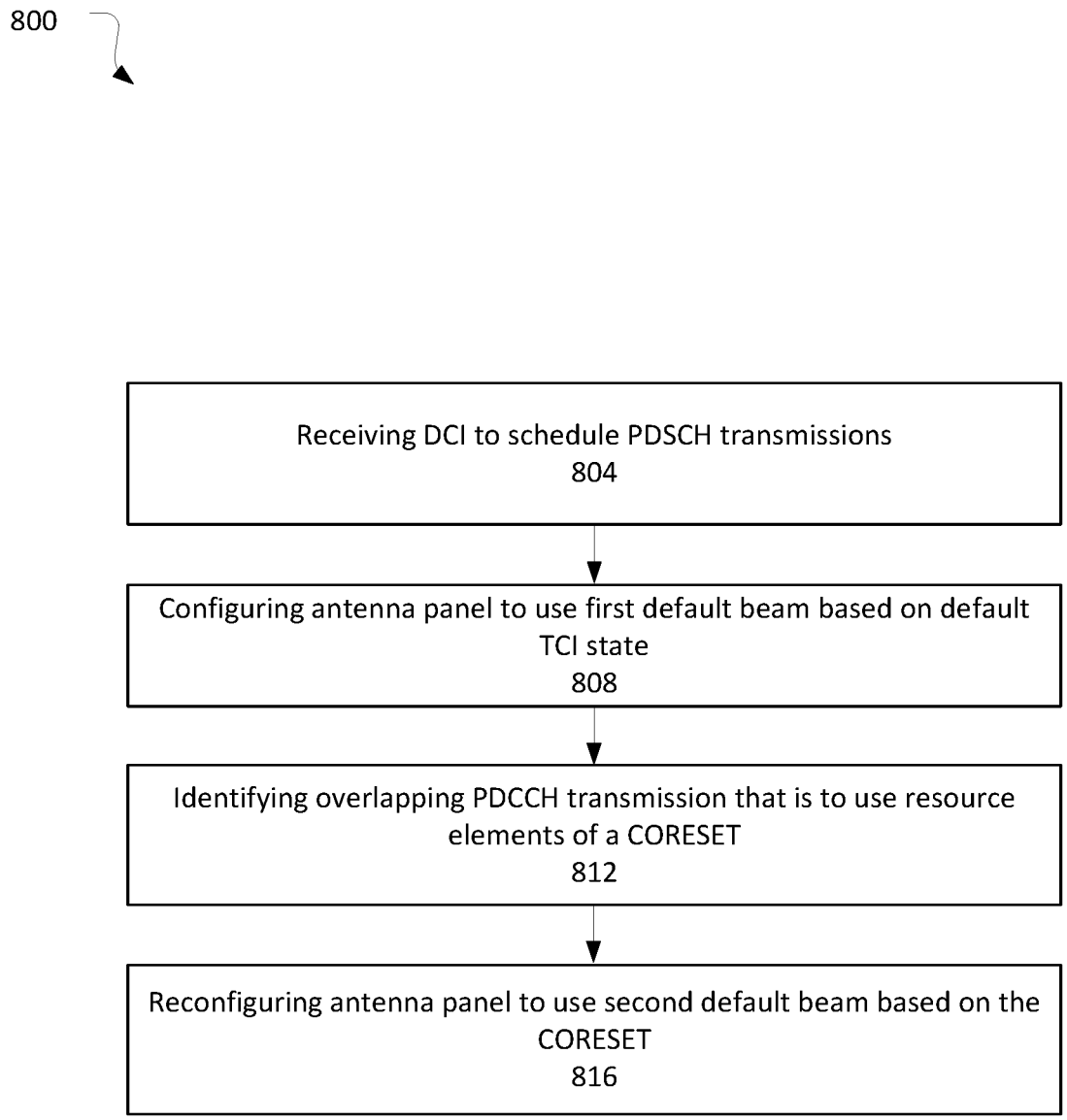
FIG. 8 illustrates an operational flow/algorithmic structure in accordance with some embodiments.

FIG. 8 may include an operation flow/algorithmic structure 800 in accordance with some embodiments. The operation flow/algorithmic structure 800 may be performed or implemented by a UE such as, for example, UE 104 or 1100; or components thereof, for example, baseband processor 1104A.

The operation flow/algorithmic structure 800 may include, at 804, receiving DCI to schedule PDSCH transmissions.

In some embodiments, the DCI may include one DCI from a first TRP to schedule two PDSCH transmissions from a plurality of TRPs. Thus, this embodiment may be a single-DCI mode embodiment.

The operation flow/algorithmic structure 800 may further include, at 808, configuring antenna panel to use first default beam based on default TCI state.

In single-DCI mode embodiments, the UE may be configured with two default TCI states. For example, a base station may provide and enableTwoDefaultTCIStates RRC parameter that enables the two default TCI states. The UE may determine which two TCI states are enabled as defaults based on the lowest TCI codepoint that indicates two TCI states. The first default beam may be set based on one of these two TCI states.

The operation flow/algorithmic structure 800 may further include, at 812, identifying an overlapping PDCCH transmission that is to use resource elements of a CORESET. The overlapping PDCCH transmission may cause the CORESET to exist during reception of the PDSCH transmissions. Therefore, in accordance with some embodiments, the UE may reconfigure an antenna panel to use a second default beam based on the existing CORESET as shown at 816 of the operation flow/algorithmic structure 800.

In some embodiments, the UE may configure the second antenna panel with a default beam based on the second of the two default TCI states. In some embodiments, the second antenna panel may be configured with the default beam based on the second default TCI state whether the first antenna panel is configured with the first default beam or the second default beam. In other embodiments, when the first antenna panel is reconfigured with the second default beam, the second antenna panel may be deactivated.

Figure 9:
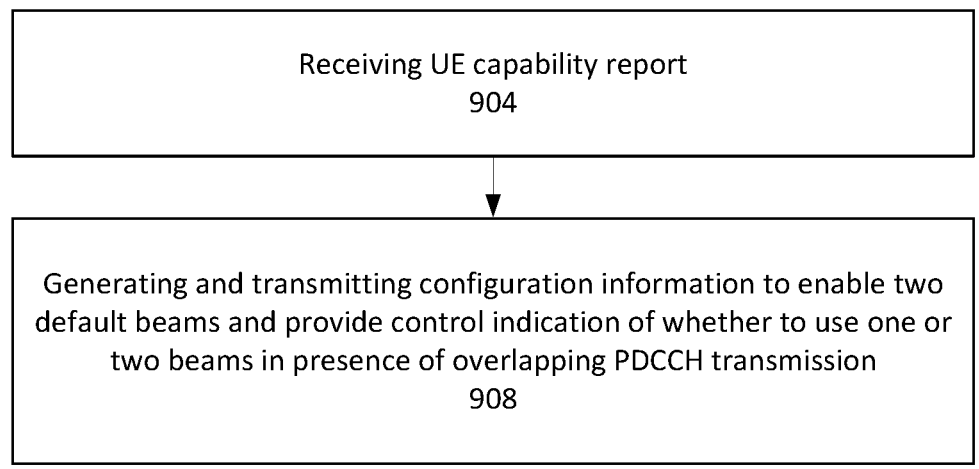
FIG. 9 illustrates an operational flow/algorithmic structure in accordance with some embodiments.

FIG. 9 may include an operation flow/algorithmic structure 900 in accordance with some embodiments. In some embodiments, the operation flow/algorithmic structure 900 may be performed or implemented by a gNB, for example, gNB 108 or 1200; or components thereof, for example, baseband processor 1204A.

The operation flow/algorithmic structure 900 may include, at 904, receiving a UE capability report. The capability report may provide an indication of whether the UE is capable of using two default beams.

The operation flow/algorithmic structure 900 may further include, at 908, generating and transmitting configuration information to enable two default beams and provide control indication of whether to use one or two beams in presence of overlapping PDCCH transmission. For example, the control indication may indicate whether the UE should, in the presence of an existing CORESET: (1) receive the PDSCH with the CORESET beam and a first/second default TCI beam; or (2) receive the PDSCH with the CORESET beam only. For another example, the control indication may indicate whether the UE should, in the presence of an existing CORESET: (1) apply a default PDSCH beam (based on default TCI state, for example) for a transmission occasion that does not collide with the existing CORESET and apply the existing CORESET beam for transmission occasions that do collide with the existing CORESET; or (2) apply the existing CORESET beam for all transmission occasions.

In various embodiments, the configuration information may be transmitted through one or more control signals. The control signals may include, for example, RRC signaling, MAC signaling, or DCI.

Figure 10:
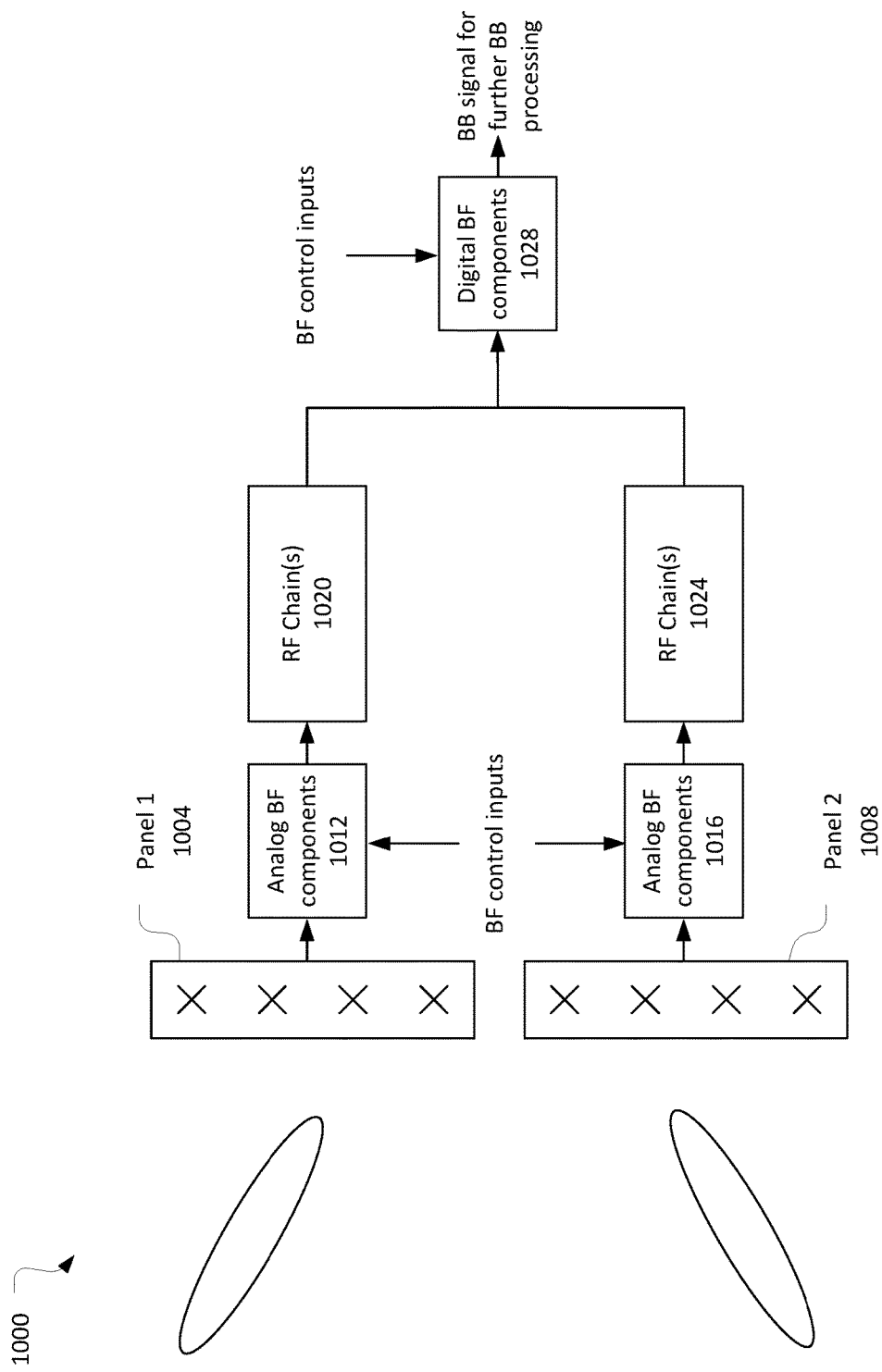
FIG. 10 illustrates receive components of a user equipment in accordance with some embodiments.

FIG. 10 illustrates receive components 1000 of the UE 104 in accordance with some embodiments. The receive components 1000 may include a first antenna panel, panel 1 1004, and a second antenna panel, panel 2 1008. Each antenna panel may include a number of antenna elements.

The antenna panels may be coupled to respective analog beamforming (BF) components. For example, panel 1 1004 may be coupled with analog BF components 1012 and panel 2 1008 may be coupled with analog BF components 1016.

The analog BF components may be coupled with one or more radio-frequency (RF) chains. For example, analog BF components 1012 may be coupled with one or more RF chains 1020 and analog BF components 1016 may be coupled with one or more RF chains 1024. The RF chains may amplify a receive analog RF signal, downconvert the RF signal to baseband, and convert the analog baseband signal to a digital baseband signal, which may be provided to digital BF components 1028. The digital BF components 1028 may provide a baseband (BB signal) for further BB processing.

In various embodiments, control circuitry, which may reside in a baseband processor, may provide BF weights to the analog/digital BF components to provide a receive beam at respective antenna panels. These BF weights may be determined by the control circuitry based on received reference signals and corresponding QCL/TCI information as described herein. In some embodiments, the BF weights may be phase-shift values provided to phase shifters of the analog BF components 1012 or complex weights provided to the digital BF components 1028. In some embodiments, the BF components and antenna panels may operate together to provide a dynamic phased-array that is capable of directing the beams in the desired direction.

In various embodiments, beamforming may include analog, only digital, or a hybrid analog-digital beamforming. Digital beamforming may utilize separate RF chains that respectively correspond to the antenna elements.

Figure 11:
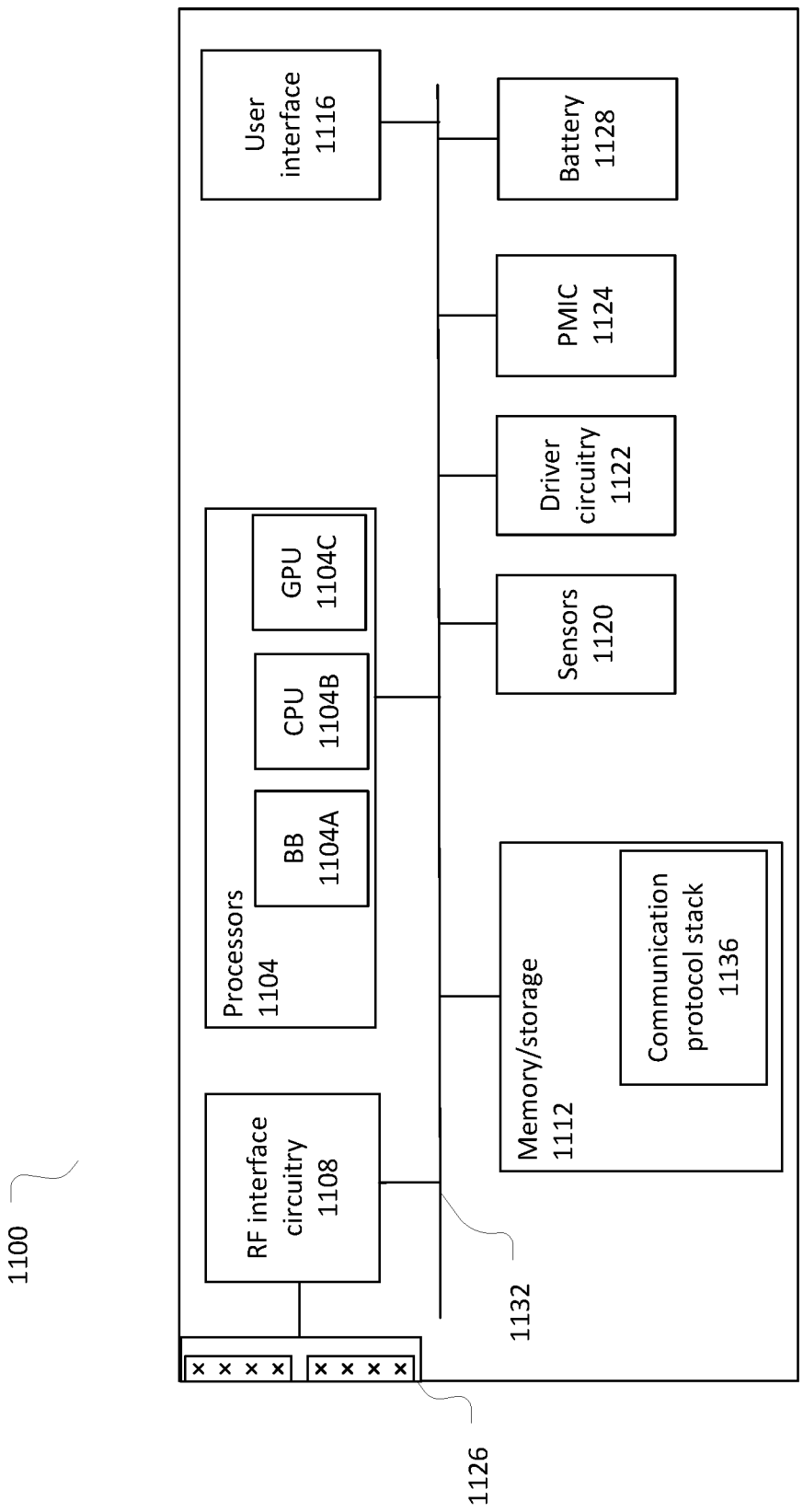
FIG. 11 illustrates a user equipment in accordance with some embodiments.

FIG. 11 illustrates a UE 1100 in accordance with some embodiments. The UE 1100 may be similar to and substantially interchangeable with UE 104 of FIG. 1.

The UE 1100 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.) video surveillance/monitoring devices (for example, cameras, video cameras, etc.) wearable devices; relaxed-IoT devices. In some embodiments, the UE may be a RedCap UE or NR-Light UE.

The UE 1100 may include processors 1104, RF interface circuitry 1108, memory/storage 1112, user interface 1116, sensors 1120, driver circuitry 1122, power management integrated circuit "PMIC" 1124, antenna structure 1126, and battery 1128. The components of the UE 1100 may be implemented as integrated circuits "ICs," portions thereof, discrete electronic devices, or other modules, logic, hardware, software, firmware, or a combination thereof. The block diagram of FIG. 11 is intended to show a high-level view of some of the components of the UE 1100. However, some of the components shown may be omitted, additional components may be present, and different arrangement of the components shown may occur in other implementations.

The components of the UE 1100 may be coupled with various other components over one or more interconnects 1132, which may represent any type of interface, input/output, bus (local, system, or expansion), transmission line, trace, optical connection, etc. that allows various circuit components (on common or different chips or chipsets) to interact with one another.

The processors 1104 may include processor circuitry such as, for example, baseband processor circuitry "BB" 1104A, central processor unit circuitry "CPU" 1104B, and graphics processor unit circuitry "GPU" 1104C. The processors 1104 may include any type of circuitry or processor circuitry that executes or otherwise operates computer-executable instructions, such as program code, software modules, or functional processes from memory/storage 1112 to cause the UE 1100 to perform operations as described herein.

In some embodiments, the baseband processor circuitry 1104A may access a communication protocol stack 1136 in the memory/storage 1112 to communicate over a 3GPP compatible network. In general, the baseband processor circuitry 1104A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1108.

The baseband processor circuitry 1104A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The memory/storage 1112 may include one or more non-transitory, computer-readable media that includes instructions (for example, communication protocol stack 1136) that may be executed by one or more of the processors 1104 to cause the UE 1100 to perform various operations described herein. The memory/storage 1112 include any type of volatile or non-volatile memory that may be distributed throughout the UE 1100. In some embodiments, some of the memory/storage 1112 may be located on the processors 1104 themselves (for example, L1 and L2 cache), while other memory/storage 1112 is external to the processors 1104 but accessible thereto via a memory interface. The memory/storage 1112 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 1108 may include transceiver circuitry and radio frequency front module (RFEM) that allows the UE 1100 to communicate with other devices over a radio access network. The RF interface circuitry 1108 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1126 and proceed to filter and amplify (with a low-noise amplifier) the signal. The signal may be provided to a receiver of the transceiver that down-converts the RF signal into a baseband signal that is provided to the baseband processor of the processors 1104.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1126.

In various embodiments, the RF interface circuitry 1108 may be configured to transmit/receive signals in a manner compatible with NR access technologies.

The antenna 1126 may include antenna elements to convert electrical signals into radio waves to travel through the air and to convert received radio waves into electrical signals. The antenna elements may be arranged into one or more antenna panels. The antenna 1126 may have antenna panels that are omnidirectional, directional, or a combination thereof to enable beamforming and multiple input, multiple output communications. The antenna 1126 may include microstrip antennas, printed antennas fabricated on the surface of one or more printed circuit boards, patch antennas, phased array antennas, etc. The antenna 1126 may have one or more panels designed for specific frequency bands including bands in FR1 or FR2.

The user interface circuitry 1116 includes various input/output (I/O) devices designed to enable user interaction with the UE 1100. The user interface 1116 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1100.

The sensors 1120 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like), depth sensors, ambient light sensors, ultrasonic transceivers; microphones or other like audio capture devices; etc.

The driver circuitry 1122 may include software and hardware elements that operate to control particular devices that are embedded in the UE 1100, attached to the UE 1100, or otherwise communicatively coupled with the UE 1100. The driver circuitry 1122 may include individual drivers allowing other components to interact with or control various input/output (I/O) devices that may be present within, or connected to, the UE 1100. For example, driver circuitry 1122 may include a display driver to control and allow access to a display device, a touchscreen driver to control and allow access to a touchscreen interface, sensor drivers to obtain sensor readings of sensor circuitry 1120 and control and allow access to sensor circuitry 1120, drivers to obtain actuator positions of electro-mechanic components or control and allow access to the electro-mechanic components, a camera driver to control and allow access to an embedded image capture device, audio drivers to control and allow access to one or more audio devices.

The power management integrated circuitry "PMIC" 1124 may manage power provided to various components of the UE 1100. In particular, with respect to the processors 1104, the PMIC 1124 may control power-source selection, voltage scaling, battery charging, or DC-to-DC conversion.

In some embodiments, the PMIC 1124 may control, or otherwise be part of, various power saving mechanisms of the UE 1100. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1100 may power down for brief intervals of time and thus save power. If there is no data traffic activity for an extended period of time, then the UE 1100 may transition off to an RRC_Idle state, where it disconnects from the network and does not perform operations such as channel quality feedback, handover, etc. The UE 1100 goes into a very low power state and it performs paging where again it periodically wakes up to listen to the network and then powers down again. The UE 1100 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1128 may power the UE 1100, although in some examples the UE 1100 may be mounted deployed in a fixed location, and may have a power supply coupled to an electrical grid. The battery 1128 may be a lithium ion battery, a metal-air battery, such as a zinc-air battery, an aluminum-air battery, a lithium-air battery, and the like. In some implementations, such as in vehicle-based applications, the battery 1128 may be a typical lead-acid automotive battery.

Figure 12:
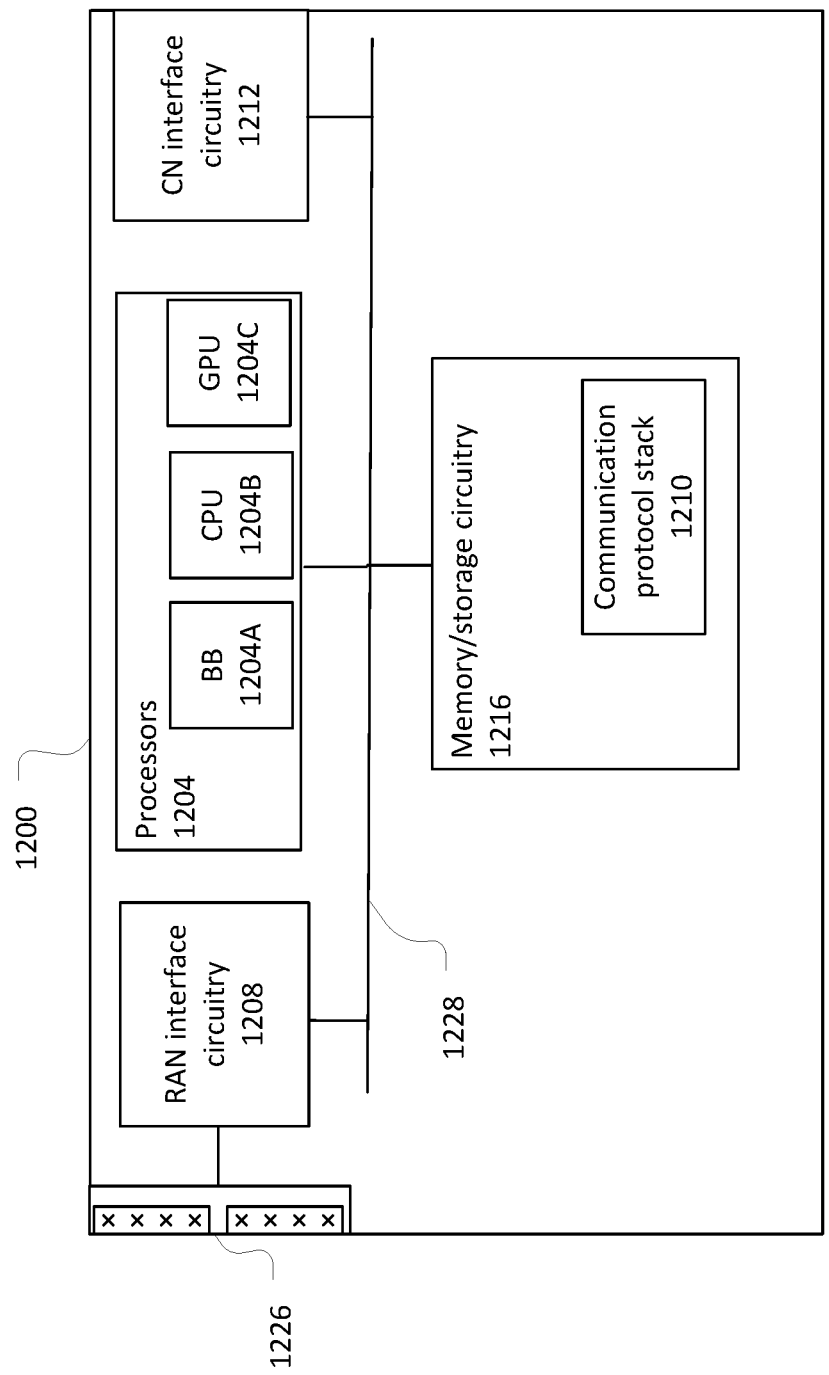
FIG. 12 illustrates a gNB in accordance with some embodiments.

FIG. 12 illustrates a gNB 1200 in accordance with some embodiments. The gNB node 1200 may similar to and substantially interchangeable with gNB 128.

The gNB 1200 may include processors 1204, RF interface circuitry 1208, core network "CN" interface circuitry 1212, memory/storage circuitry 1216, and antenna structure 1226.

The components of the gNB 1200 may be coupled with various other components over one or more interconnects 1228.

The processors 1204, RF interface circuitry 1208, memory/storage circuitry 1216 (including communication protocol stack 1210), antenna structure 1226, and interconnects 1228 may be similar to like-named elements shown and described with respect to FIG. 11.

The CN interface circuitry 1212 may provide connectivity to a core network, for example, a $5^{th}$ Generation Core network "5GC" using a 5GC-compatible network interface protocol such as carrier Ethernet protocols, or some other suitable protocol. Network connectivity may be provided to/from the gNB 1200 via a fiber optic or wireless backhaul. The CN interface circuitry 1212 may include one or more dedicated processors or FPGAs to communicate using one or more of the aforementioned protocols. In some implementations, the CN interface circuitry 1212 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Examples

In the following sections, further exemplary embodiments are provided.

Example 1 include the method of operating a UE, the method comprising: receiving a plurality of downlink control information (DCI) from a plurality of transmit and receive points (TRPs) to schedule a plurality of physical downlink shared channel (PDSCH) transmissions; configuring, based on first and second control resource set (CORESETs) associated with the plurality of DCIs, a first antenna panel to use a first default beam and a second antenna panel to use a second default beam to receive the plurality of PDSCH transmissions; detecting a physical downlink control channel (PDCCH) associated with a third CORESET that overlaps at least one of the PDSCH transmissions; and reconfiguring the first antenna panel with a third default beam to receive at least part of the plurality of PDSCH transmissions based on the third CORESET.

Example 2 includes the method of example 1 or some other example herein, further comprising configuring the first antenna panel to use the first default beam based on the first CORESET and the first and third CORESETs are associated with a first CORESET pool.

Example 3 includes the method of example 1 or some other example herein, further comprising after the first panel is reconfigured with the third default beam, receiving at least part of the plurality of PDSCH transmissions with the second and third default beams.

Example 4 includes a method of example 1 or some other example herein, further comprising after the first panel is reconfigured with the third default beam, receiving at least part of the plurality of PDSCH transmissions only with the third default beam.

Example 5 includes a method of example 1 or some other example herein, wherein the plurality of PDSCH transmissions are scheduled in a first component carrier and the PDCCH is detected in a second component carrier.

Example 6 includes the method of example 5 or some other example herein, wherein the first and second component carriers are in a common band or band group.

Example 7 includes a method of example 1 or some other example herein, wherein the PDCCH is a first PDCCH, the third CORESET is in a first CORESET pool, and the method further comprises: detecting a second PDCCH associated with a fourth CORESET that is in the first CORESET pool, wherein the second PDCCH overlaps with the first PDCCH; determining the first PDCCH has a greater priority than the second PDCCH; and reconfiguring the first antenna panel with the third default beam based on the first PDCCH having the greater priority.

Example 8 includes a method of example 7 or some other example herein, wherein determining the first PDCCH has the greater priority, comprises: comparing search spaces of the third CORESET and the fourth CORESET.

Example 9 includes method of example 8 or some other example herein, wherein comparing the search spaces of the third CORESET in the fourth CORESET comprises comparing search space parameters that include search space types, search space subtypes, periodicities, or identifiers.

Example 10 includes the method of example in the one or some other example herein, further comprising generating a report based on a synchronization signal block or channel state information-reference signal, wherein the measurement process identifier is taken from transmission configuration indicator (TCI) of the PDCCH.

Example 11 includes a method of operating a UE, the method comprising: receiving downlink control information (DCI) from a first transmit and receive point (TRP) to schedule a plurality of physical downlink shared channel (PDSCH) transmissions from a corresponding plurality of TRPs; configuring the antenna panel to use a first default beam based on a default transmission configuration indicator (TCI) state; identifying an overlapping physical downlink control channel (PDCCH) transmission that is to use resource elements of a control resource set (CORESET); and reconfiguring the antenna panel to use a second default beam based on the CORESET.

Example 12 includes the method of example 11 or some other example herein, wherein the antenna panel is a first antenna panel, the plurality of PDSCH transmissions are frequency-division multiplexed or spatial-division multiplexed transmissions, the default TCI state is a first default TCI state, and the method further comprises: configuring a second antenna panel to use a third default beam based on the second default TCI state.

Example 13 includes a method of example 12 or some other example herein, wherein after reconfiguring the first antenna panel the method further comprises: receiving at least a portion of the plurality of PDSCH transmissions with the first antenna panel using the second default beam and the second antenna panel using the third default beam.

Example 14 includes a method of example 12 or some other example herein, wherein after reconfiguring the first antenna panel the method comprises receiving at least a portion of the plurality of PDSCH transmissions with the first antenna panel using the second default beam and deactivate the second antenna panel.

Example 15 includes a method of example 11 or some other example herein, further comprising: receiving control signaling from a base station to indicate whether the UE is to use one antenna panel or two antenna panels to receive PDSCH transmissions when one or more overlapping PDCCH transmissions are present.

Example 16 includes the method of example 11 or some other example herein, further comprising: transmitting a UE capability report to a base station, the UE capability report to include an indication of whether the UE is capable of using one antenna panel or two antenna panels to receive a PDSCH transmission when one or more overlapping PDCCH transmissions are present.

Example 17 includes a method of example 11 or some other example herein, wherein the overlapping PDCCH transmission is a first overlapping PDCCH transmission, the CORESET is a first CORESET, and the method further comprises: identifying a second overlapping PDCCH transmission that is to use resource elements of a second CORESET; determining the first CORESET has a greater priority than the second CORESET; and reconfiguring the antenna panel to use the second default beam based on the first CORESET having the greater priority.

Example 18 includes the method of example 17 or some other example herein, wherein determining the first CORESET has the greater priority comprises comparing search spaces of the first and second CORESETs.

Example 19 includes a method of operating a base station, the method comprising: receiving a user equipment (UE) capability report that includes an indication of whether the UE is capable of using one or two default beams to receive physical downlink shared channel (PDSCH) transmissions when one or more overlapping physical downlink control channel (PDCCH) transmissions are present; transmitting configuration information to the UE to enable the use of two default beams to receive PDSCH transmissions and a control indication, based on the UE capability report, for the UE to use either one or two default beams to receive PDSCH transmissions when one or more overlapping PDCCH transmissions are present.

Example 20 includes a method of example 19 or some other example herein, further comprising: transmitting one or more DCI to schedule a plurality of PDSCH transmission occasions, wherein the plurality of PDSCH occasions are scheduled with a scheduling offset less than a predetermined threshold, and the control indication is to indicate the UE is to use one default beam to receive PDSCH transmissions in all of the plurality of PDSCH transmission occasions.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, IE, packet, frame, segment, PDU, or message as described in or related to any of examples 1-64, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more computer-readable storage media having instructions that, when executed, cause processing circuitry to:
    process first downlink control information (DCI) to determine a schedule of a first physical downlink shared channel (PDSCH) transmission;
    process second DCI to determine a schedule of a second PDSCH transmission;
    configure, based on a first control resource set (CORESET) associated with the first DCI, a first antenna panel to use a first default beam to receive the first PDSCH transmission, wherein the first CORESET is configured with a first CORESET pool index;
    configure, based on a second CORESET associated with the second DCI, a second antenna panel to use a second default beam to receive the second PDSCH transmission, wherein the second CORESET is configured with a second CORESET pool index;
    detect a physical downlink control channel (PDCCH) associated with a third CORESET configured with the first CORESET pool index, wherein the PDCCH overlaps the first PDSCH transmission; and
    reconfigure, based on the first CORESET and the third CORESET being configured with the first CORESET pool index, the first antenna panel with a third default beam to receive the PDCCH.

2. The one or more computer-readable media of claim 1, wherein the instructions, when executed, further cause the processing circuitry to: after the first antenna panel is reconfigured with the third default beam, receive at least part of the first PDSCH transmission or the second PDSCH transmission with the second and third default beams.

3. The one or more computer-readable media of claim 1, wherein the instructions, when executed, further cause the processing circuitry to: after the first antenna panel is reconfigured with the third default beam, receive at least part of the first PDSCH transmission or the second PDSCH transmission only with the third default beam.

4. The one or more computer-readable media of claim 1, wherein the first and second PDSCH transmissions are scheduled in a first component carrier and the PDCCH is detected in a second component carrier.

5. The one or more computer-readable media of claim 4, wherein the first and second component carriers are in a common band or band group.

6. The one or more computer-readable media of claim 1, wherein the PDCCH is a first PDCCH, the third CORESET is in a first CORESET pool, and the instructions, when executed, further cause the processing circuitry to:
    detect a second PDCCH associated with a fourth CORESET that is in the first CORESET pool, wherein the second PDCCH overlaps with the first PDCCH;
    determine the first PDCCH has a greater priority than the second PDCCH; and
    reconfigure the first antenna panel with the third default beam based on the first PDCCH having the greater priority.

7. The one or more computer-readable media of claim 6, wherein to determine the first PDCCH has the greater priority, the processing circuitry is to: compare search spaces of the third CORESET and the fourth CORESET.

8. The one or more computer-readable media of claim 7, wherein to compare the search spaces of the third CORESET and the fourth CORESET, the UE is to compare search space parameters that include search space types, search space subtypes, periodicities, or identifiers.

9. The one or more computer-readable media of claim 1, wherein the instructions, when executed, further cause the processing circuitry to:
    generate a report based on a synchronization signal block or channel state information-reference signal, wherein the report is to include a measurement process identifier taken from a transmission configuration indicator (TCI) of the PDCCH.

10. A baseband processor comprising:
processing circuitry to:
receive downlink control information (DCI) from a first transmit and receive point (TRP) to schedule a plurality of physical downlink shared channel (PDSCH) transmissions from a corresponding plurality of TRPs;
select a first default transmission configuration indicator (TCI) state and a second default TCI state based on a lowest TCI codepoint having two TCI states;
configure a first antenna panel to use a first default beam based on the first default TCI state;
configure a second antenna panel to use a second default beam based on the second default TCI state;
identify an overlapping physical downlink control channel (PDCCH) transmission that is to use resource elements of a control resource set (CORESET) associated with a third default TCI state;
determine the third default TCI state is different from the first and second default TCI states; and
reconfigure the first antenna panel to use a third default beam based on the third default state and determination that the third default TCI state is different from the first and second default TCI states; and
interface circuitry coupled with the processing circuitry, the interface circuitry to communicatively couple the processing circuitry with a component.

11. The baseband processor of claim 10, wherein the plurality of PDSCH transmissions are frequency-division multiplexed or spatial-division multiplexed transmissions.

12. The baseband processor of claim 11, wherein after reconfiguring the first antenna panel the processing circuitry is further to: receive at least a portion of the plurality of PDSCH transmissions with the first antenna panel using the third default beam and the second antenna panel using the second default beam.

13. The baseband processor of claim 11, wherein after reconfiguring the first antenna panel the processing circuitry is further to: receive at least a portion of the plurality of PDSCH transmissions with the first antenna panel using the third default beam and deactivate the second antenna panel.

14. The baseband processor of claim 10, wherein the processing circuitry is further to: receive control signaling from a base station to indicate whether the UE is to use one antenna panel or two antenna panels to receive PDSCH transmissions when one or more overlapping PDCCH transmissions are present.

15. The baseband processor of claim 10, wherein the processing circuitry is further to: transmit a user equipment (UE) capability report to a base station, the UE capability report to include an indication of whether a UE is capable of using one antenna panel or two antenna panels to receive a PDSCH transmission when one or more overlapping PDCCH transmissions are present.

16. The baseband processor of claim 10, wherein the overlapping PDCCH transmission is a first overlapping PDCCH transmission, the CORESET is a first CORESET, and the processing circuitry is further to: identify a second overlapping PDCCH transmission that is to use resource elements of a second CORESET; determine the first CORESET has a greater priority than the second CORESET; and reconfigure the first antenna panel to use the third default beam based on the first CORESET having the greater priority.

17. The baseband processor of claim 16, wherein to determine the first CORESET has the greater priority, the processing circuitry is to compare search spaces of the first and second CORESETs.

18. A method comprising:
processing first downlink control information (DCI) to determine a schedule of a first physical downlink shared channel (PDSCH) transmission;
processing second DCI to determine a schedule of a second PDSCH transmission;
configuring, based on a first control resource set (CORESET) associated with the first DCI, a first antenna panel to use a first default beam to receive the first PDSCH transmission, wherein the first CORESET is configured with a first CORESET pool index;
configuring, based on a second CORESET associated with the second DCI, a second antenna panel to use a second default beam to receive the second PDSCH transmission, wherein the second CORESET is configured with a second CORESET pool index;
detecting a physical downlink control channel (PDCCH) associated with a third CORESET configured with the first CORESET pool index, wherein the PDCCH overlaps the first PDSCH transmission; and
reconfiguring, based on the first CORESET and the third CORESET being configured with the first CORESET pool index, the first antenna panel with a third default beam to receive the PDCCH.

19. The method of claim 18, further comprising:
after the first antenna panel is reconfigured with the third default beam, receiving at least part of the first PDSCH transmission or the second PDSCH transmission with the second and third default beams.

20. The method of claim 18, wherein the first PDSCH transmission and the second PDSCH transmission are scheduled in a first component carrier and the PDCCH is detected in a second component carrier.

* * * * *